Nov. 17, 1942.　　　A. A. JOHNSON　　　2,301,917
COFFEE MAKER
Filed Feb. 12, 1940　　　2 Sheets-Sheet 1
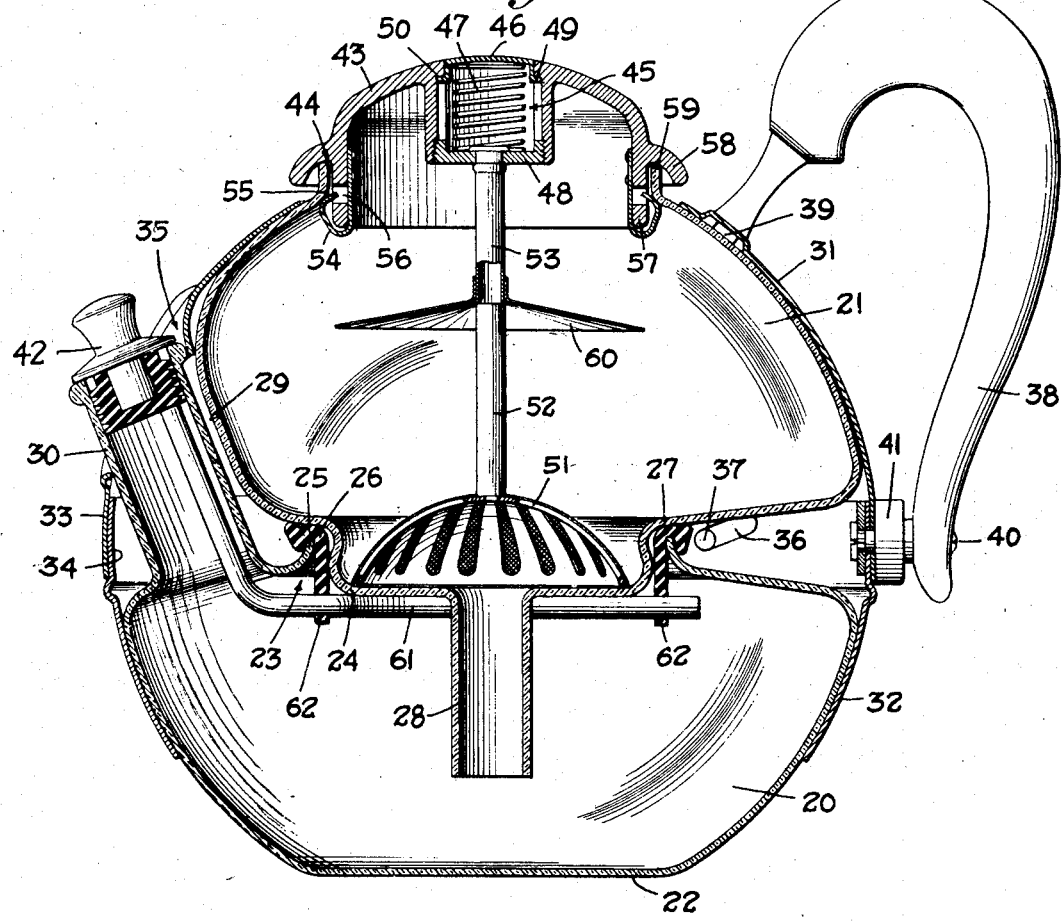
INVENTOR Nov. 17, 1942.    A. A. JOHNSON    2,301,917
COFFEE MAKER
Filed Feb. 12, 1940    2 Sheets-Sheet 2

INVENTOR

Patented Nov. 17, 1942

2,301,917

UNITED STATES PATENT OFFICE 2,301,917

COFFEE MAKER

Arthur A. Johnson, Bridgeport, Conn., assignor to Casco Products Corporation, Bridgeport, Conn., a corporation of Connecticut Application February 12, 1940, Serial No. 318,408

13 Claims. (Cl. 53—3)

This invention relates to coffee makers, and, more particularly, to the type in which water in a lower vessel is forced by pressure formed above the water due to heating of the same up through ground coffee in an upper vessel, and then subsequently drawn down through the ground coffee as a result of a partial vacuum being formed in the lower or water heating vessel upon cooling of the latter. This type of appliance has been termed a vacuum type coffee maker.

Previous coffee makers of this type have generally consisted of a lower or water heating vessel having a single opening or orifice down into which a hollow stem on the upper or coffee steeping vessel extends. The upper vessel usually is supported on the lower vessel in a manner so as to seal the latter.

Coffee brewed by an appliance such as just described is excellent, but the appliance is cumbersome, and, to pour the coffee after the same had been brewed, it is necessary to remove the upper vessel and store it in some safe place. The storage of the upper vessel presents many times a perplexing problem, for it cannot be supported upright due to the hollow stem projecting from its base, unless it be supported on a holder having an opening to take the tube, and, even when so supported, it is easily tipped over because the center of gravity of the vessel is above the point at which it is supported by the holder.

The heretofore proposed vacuum type coffee makers have presented another difficulty in that it was quite easy to tip them over while the coffee is being brewed, for the superposition of the steeping vessel on the water heating vessel disposed the center of gravity of the appliance relatively high above the supporting surface which is particularly true when the water has been forced up into the upper vessel.

It was found also that when the water from the lower vessel had been expelled to a point where the level thereof is below the orifice of the downwardly projecting tube, bubbles of air were forced up through the liquid in the steeping vessel causing considerable agitation which frequently broke the airtight seal between the tube of the upper vessel and the lower vessel.

The difficulties above referred to are obviated by the present invention by the provision of a coffee maker of the vacuum type in which the upper or steeping vessel and the lower or water heating vessel are supported together as a unit both while the coffee is being made and while it is being poured from the appliance after being brewed.

The appliance of the present invention permits coffee to be brewed and served at the dining table without the inconvenience and bother, which is now attendant upon the removal and storage of the steeping vessel after the coffee is brewed and before it may be served. In the appliance of the present invention also, as the seal between the upper and lower chamber is mechanically maintained at all times, the possibility of the seal between the upper and lower vessels being broken due to agitation of the steeping vessel, either because of the bubbles of air which are sometimes forced up through the liquid, or, because the same was inadvertently jarred, is obviated. This feature of the invention prevents the seepage of air into the lower vessel through this seal, which seepage would delay the return of the brewed coffee to the lower vessel and might even prevent some of the return of the brewed coffee to the lower vessel.

To facilitate serving of the brewed coffee, the appliance of the present invention is provided with a pouring spout formed on the lower vessel through which the brewed coffee may be poured. This spout is completely sealed by a suitable stopple during the brewing of the coffee and prevents any egress of air into the lower vessel so that the action of the appliance is in no way impaired.

To prevent the stopple used with the pouring spout from becoming lost after the coffee is brewed, and it is desired to serve the same, the stopple may be conveniently stored, in one form of the invention, in a cap closing an opening in the upper vessel, and, in another form of the invention, in a suitable receptacle formed in the handle of the appliance.

The lower vessel of the appliance disclosed in the present invention carries an air inlet tube disposed in said spout and extending into the lower vessel adjacent the top wall thereof to permit the free passage of air into the lower vessel so that the brewed coffee may be poured through the spout without being impeded either by the partial vacuum which would be otherwise formed in the lower vessel after a portion of the coffee had been withdrawn or by an inrush of air attempting to enter the lower vessel through the pouring spout. The air inlet tube is preferably held in place by the mechanically maintained sealing means between the upper and lower chamber to obviate any possibility of the tube becoming displaced during the use of the appliance.

Appliances of this type are provided with a filter device carried by the upper vessel to prevent any of the ground coffee being drawn down into the lower vessel after the brewing operation, and various means, many of which were cumbersome and difficult to use, have been heretofore proposed to hold the filter device in some predetermined position on the lower wall of the upper vessel.

There has been a great deal of annoyance attending the use of these previously proposed means, and to obviate this annoyance, the filter device of the present invention, in one form illustrated herein, is held in its proper position by a member depending from a cap closing an opening in the upper vessel. The filter is held in its proper position over the tube extending down into the lower vessel by the mere placing of the cap closing the opening in the upper vessel, and obviates the annoying manipulation of the previously proposed means for mounting the filter over the tube.

In another form of the present invention, the filter itself carries means cooperable with the annular wall of the upper vessel to removably hold the filter in a predetermined position on the bottom wall of the upper vessel. The filter in this form of the invention, although securely held in position over the tube, may, nevertheless, be easily removed for cleaning.

Other features and advantages will hereinafter appear.

In the accompanying drawings—

Figure 1 is a vertical section through the coffee maker of the present invention showing the parts in the positions they occupy during the brewing operation.

Fig. 2 is a fragmentary top plan view of the lower vessel of the coffee maker of the present invention.

Figure 3:
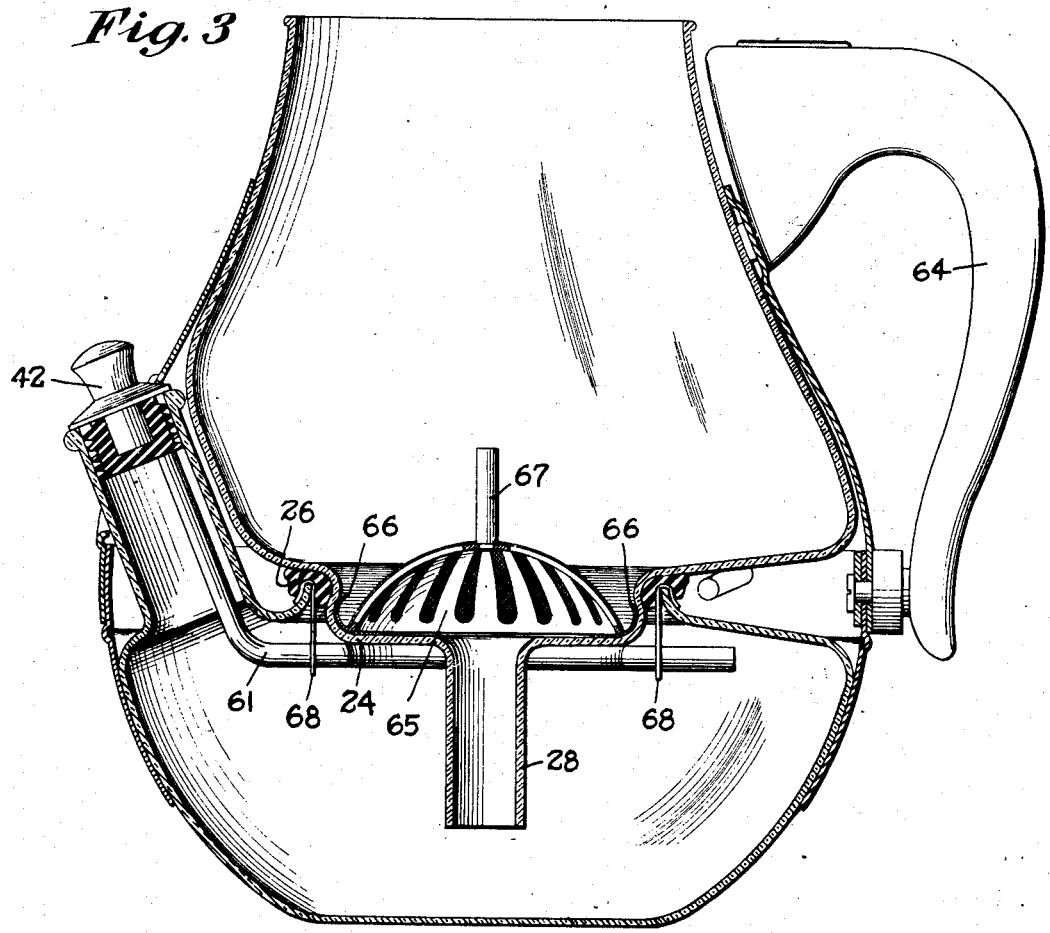
Fig. 3 is a view similar to Fig. 1, but showing a modified form of the present invention.

As shown in the accompanying drawings, referring particularly to Fig. 1, the coffee maker of the present invention comprises a lower or water heating vessel 20 and an upper or steeping vessel 21, both vessels being approximately hemispherical and having their relatively flat sides juxtaposed so that when they are assembled the two vessels form a substantially spherical body.

The bottom of the lower vessel 20 is provided with a flat surface or base 22 by means of which the appliance may be supported upon a suitable surface, and at its upper end the vessel 20 has a relatively wide open mouth 23 adapted to receive a sump portion 24 of the steeping vessel 21. A lip 25 of the mouth 23 supports a gasket 26 of rubber or other suitable material which is engaged by a bottom portion 27 of the steeping vessel 21 and supports the steeping vessel on the lower vessel with the sump 24 extending into the lower vessel. The steeping vessel has the usual downwardly extending tube 28 through which water contained within the bottom vessel 20, when heated, will pass upwardly through ground coffee in the sump 24 and into the steeping vessel 21 where the coffee is brewed.

As shown in Fig. 1, the steeping vessel is suitably shaped as at 29 to provide clearance for an upwardly extending spout 30 communicating with the lower vessel 20, and through which the brewed coffee may be poured.

According to the present invention, the lower vessel 20 and the upper or steeping vessel 21 are held together as a unit and for this purpose any suitable means may be employed. In the now preferred form of the invention, the two vessels are united by a pair of properly shaped casings 31 and 32, overlying and underlying respectively the largest dimensions of the vessels 21 and 20. These casing parts are provided with overlying marginal portions 33 and 34 which are suitably secured together. The upper casing 31 is provided with an aperture 35 through which the pouring spout 30 of the lower vessel extends.

The casing parts 31 and 32 may be secured together by any suitable means, but preferably are secured together by bayonet locks comprising slots 36 formed in the casing part 32 and pins 37 carried by the casing part 31. After the vessels 20 and 21 are superposed, the parts 31 and 32 are placed over and under the vessels so that the pins 37 enter the slots 36, whereupon the lower casing part is turned relative to the upper casing part causing the parts to be drawn together by the inclined walls of the slots.

The appliance of the present invention is preferably provided with a handle to facilitate handling of the appliance, and, as herein shown, the handle 38 is secured at the upper end to casing part 31 by a rivet 39 and at the lower end is secured to the overlapped portions of the casing parts by a screw member 40 which is passed through suitable aligned apertures formed in the overlapped portions of the casing parts and threaded into a nut member 41 carried by the handle adjacent the lower end thereof.

It is necessary to prevent the escape of air and water vapor from the lower vessel 20 as the water is heated because it is the expansion of the air and water vapor above the water level in the lower vessel which forces the water therein to rise in the tube 28 and enter the steeping vessel. To prevent the loss of air and water vapor from the lower vessel 20, the spout 30 is provided with a stopple 42, which is removed when it is desired to pour or serve the brewed coffee.

To prevent the stopple 42 from being misplaced when it is removed from the pouring spout, there is formed in a cap 43 closing an opening 44 in the upper vessel 21 of the appliance, illustrated in Fig. 1, a suitable receptacle for receiving the stopple. This receptacle comprises a well 45 normally closed by a flanged disk 46 resiliently held in the position, shown in Fig. 1, by a coil spring 47 seating on a disk 48 which is threaded into the lower part of the well to form the bottom wall thereof. The well is provided with an annular downwardly facing shoulder 49 against which the flange 50 of the disk 46 is held by the spring 47 to limit the upper movement of the disk. The disk 46 may be easily depressed and the stopple 42, when removed from the pouring spout, may be inserted into the well and frictionally held therein against the action of the spring.

To prevent coffee grounds held by the sump 24 from being drawn down through the tube 28 into the lower vessel after the brewing operation, a suitable filter or strainer is used to retain the coffee grounds in the sump.

In the broader aspects of the invention, any suitable filter or strainer may be used, but, in the invention herein disclosed, this is accomplished by providing a filter received in the sump 24 and held over the opening at the upper end of the tube 28. The filter, as shown, may be covered with some suitable cloth to strain the brewed coffee and prevent the grounds from passing down into the lower vessel.

In the previously proposed coffee makers of this type, various means have been employed for holding the filter over the opening at the upper end of the tube so that coffee grounds cannot be drawn down into the lower vessel after the coffee has been brewed. In many of these previous devices, the means employed for properly seating the filter over the usual tube 28 have been cumbersome and difficult to use, and, consequently, were a source of annoyance to a user of a coffee maker of this type.

To obviate this annoyance, the filter, in the form of the invention shown in Fig. 1, comprises an apertured dome-shaped metallic member 51 about which is preferably fitted a suitable filter cloth or the like. The dome-shaped member 51 is provided with a small rod-like handle 52 extending upwardly therefrom to facilitate handling of the filter. The handle 52 extends up into the upper vessel to a point adjacent the top thereof, and the upper extremity thereof is engaged by a tube 53 depending from the disk 48 which is threaded into the lower part of the well 45 of the cap 43.

The cap 43 is provided with a plurality of annular fingers 54 which are reversely bent upon themselves and the reverse bent portion of each finger is laterally offset as at 55, which laterally offset portions ride in suitable apertures 56 formed in the skirt 57 of the cap. The resilient fingers engage the undersurface of the wall of the upper vessel adjacent the opening therein and resiliently hold a sealing flange 58 of the cap against the lip 59 of the opening 44. This, as will be seen, causes the lower extremity of the tube to tightly engage the upper end of the handle 52 carried by the filter, and, therefore, urges the filter against the lower wall of the sump 24 of the upper vessel. The tube 53 carries a deflector plate 60 to prevent liquid from splashing against the undersurface of the cap during the brewing operation and seeping out of the upper vessel through the opening therein.

The deflector plate 60 has a concave undersurface which, when engaged by the upper extremity of the handle carried by the filter, will tend to center the filter so that by merely placing the cap in the opening, the filter will be, by one manipulation, centered over the tube 28 and also held in that position until the cap is removed.

It will, therefore, be seen that the filter is held in its proper position over the tube by the placing of the cap in the opening 44, and that the annoyance attending the use of the prior devices employed to hold the filter in its proper position, in the previously proposed coffee makers of this type, has been obviated.

When the brewed coffee is to be poured from the lower vessel it is necessary, to insure a smooth pouring action, that the liquid removed be replaced by air. It cannot be supplied through the pouring spout without effecting the pouring action of the spout so that it is necessary to provide means for allowing air to enter the lower vessel through other means of entrance than the pouring spout 30.

Air cannot enter from the upper vessel, for the ground coffee in the sump packs so tightly against the filter, after the coffee has been drawn back into the lower vessel that sufficient air cannot enter the lower vessel through the wet coffee grounds.

Means must be provided, therefore, for supplying air to the lower vessel as the same is emptied of the brewed coffee. Any suitable means may be employed, but in the specific embodiment of the invention illustrated by Fig. 1, this is accomplished by providing an air inlet tube 61, and conveniently this air inlet tube may be secured to and be supported by a downwardly extending ring 62 forming a part of the gasket 26. This tube is disposed in the pouring spout, as shown, extends downwardly through the spout and into the lower vessel adjacent the upper wall thereof and then across the lower vessel to a point diametrically opposite the pouring spout. The tube, as shown in Fig. 2, is given a suitable curvature to provide clearance for the tube 28.

It will be seen, therefore, that when the coffee has been brewed and it is desired to pour the same, the stopple may be removed from the pouring spot and stored within the well of the cap and the coffee poured through the spout without difficulty, for air will be supplied, the lower vessel above the brewed coffee, and prevent any formation of a partial vacuum therein which would impede the pouring action as air would attempt to enter the spout to replace the volume of coffee emptied from the lower vessel.

Figure 4:
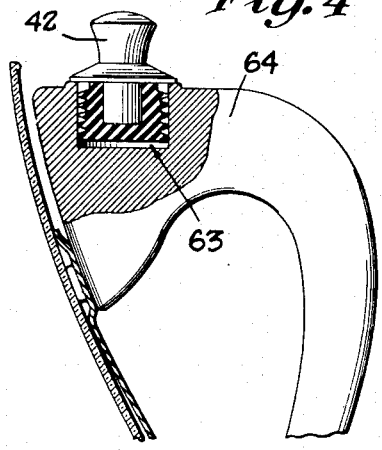
Fig. 4 is a sectional view of the upper portion of the handle of the coffee maker of the present invention showing the pouring spout stopple mounted in the receptacle formed in the handle.

There is illustrated in Fig. 3 a modified form of the present invention. In this form of the invention, the upper and lower vessels are secured together and held as a unitary appliance by the identical means shown in that form of the invention illustrated in Fig. 1. In the form of the invention illustrated in Fig. 3, the cap closing the opening in the upper vessel has been dispensed with and the stopple 42 closing the pouring spout in this form of the invention is stored within a suitable well 63 formed in the upper portion of the handle 64 as clearly illustrated in Fig. 4.

The filter means of the form of the invention illustrated in Fig. 3 comprises a dome-shaped apertured plate 65 about which a suitable filter cloth is secured. The plate is provided in this form of the invention with a plurality of resilient fingers 66 which are adapted to engage the annular wall of the sump 24 to removably hold the filter device in its proper position over the tube 28. The wall of the sump, as clearly shown, flares somewhat toward the bottom wall thereof and cooperates with the resilient fingers of the filter device to urge the filter device tightly against the bottom wall of the sump, to prevent any of the ground coffee from being drawn down through the tube 28 into the lower vessel after the brewing operation.

The filter device is provided with a small upstanding handle 67 which may be conveniently grasped by a user to remove the filter device for cleaning or other purposes. The filter may be easily removed by simply giving a slight tug to the handle member 67 to cause the fingers to release their resilient grip on the wall of the sump.

The means provided in this form of the invention for supplying air to the lower vessel is the same as shown in Fig. 1, but in this modification of the invention the air inlet tube 61 is carried by members 68 hung over the lip of the opening of the lower vessel which members are held in position by the gasket 26 which seals the opening and which seal is mechanically maintained at all times. The air inlet tube extends from the mouth of the pouring spout down into the lower vessel and then across the same to a point diametrically opposite the pouring spout. The action of the air inlet tube in this form of the invention, as will be readily seen, is identical with the action of the air inlet tube in the form of the invention shown in Fig. 1, and will effectively prevent any formation of a partial vacuum in the lower vessel as the coffee therein is poured through the spout.

Variations and modifications may be made within the scope of this invention, and portions of the improvements may be used without others.

I claim:

1. A coffee maker of the vacuum type comprising a lower vessel and an upper vessel superposed on the lower vessel and having a tube extending into the lower vessel near the bottom thereof; means for securing the vesesls together so as to form a unitary utensil for brewing and pouring of the coffee; means for sealing the junction of the upper and lower vessels against the atmosphere when the two vessels are secured together; a pouring spout on the lower vessel; removable means for closing the spout against the passage of air while the water in the lower vessel is being expelled through the said tube and while the brewed coffee is returning to the lower vessel; and means, rendered operative by removal of said spout-closing means from said spout, and carried by said sealing means and supported thereby within said lower vessel for permitting ingress of air into the same so that air will be supplied to the lower vessel as the brewed coffee is poured from the same.

2. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; means for sealing the junction of the upper and lower vessels against the atmosphere when the two vessels are secured together; a pouring spout on the lower vessel; removable means for closing the spout against the passage of air while the water in the lower vessel is being expelled through the said tube, and while the brewed coffee is returning to the lower vessel; and air inlet means disposed in said lower vessel, carried in suspended relation by said sealing means, and extending into said spout for supplying air to said lower vessel as the brewed coffee is poured from the same through the spout.

3. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; means for sealing the junction of the upper and lower vessels against the atmosphere when the two vessels are secured together; a pouring spout on the lower vessel; removable means for closing the spout against the passage of air while the water in the lower vessel is being expelled through the said tube and while the brewed coffee is returning to the lower vessel; an air inlet tube disposed in said spout and extending into said lower vessel for permitting free passage of air into the same after the coffee is brewed and while it is being poured; and means held against displacement by the sealing means for supporting said air inlet tube within said lower vessel.

4. A coffee maker of the vacuum type comprising a lower vessel and an upper vessel superposed on the lower vessel and having a tube extending into the lower vessel through an opening therein; means for securing the vessels together so as to form a unitary utensil for brewing and pouring of the coffee; means for sealing the junction of the upper and lower vessels against the atmosphere when the two vessels are secured together; a pouring spout on the lower vessel; means for closing the spout against the passage of air while the water in the lower vessel is being expelled through the said tube and while the brewed coffee is returning to the lower vessel; an air inlet tube disposed in said spout and extending across said lower vessel to a point substantially diametrically opposite said spout to permit the free passage of air into said lower vessel to prevent the formation of a vacuum above the level of the brewed coffee as the same is poured from the lower vessel through said spout; and means for supporting said air inlet tube against displacement, said means comprising means depending from the lip of the opening in said lower vessel.

5. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; means for sealing the junction of the upper and lower vessels against the atmosphere when the two vessels are secured together; a pouring spout on the lower vessel; removable means for closing the spout against the passage of air while the water in the lower vessel is being expelled through the said tube and while the brewed coffee is returning to the lower vessel; and an air inlet tube carried by said sealing means and disposed in said spout and extending into the said lower vessel for permitting free passage of air into the same to prevent the formation of a vacuum above the level of the brewed coffee as the same is being poured from the lower vessel through said spout.

6. A coffee maker of the vacuum type comprising a lower vessel having an opening at the top thereof and an upper vessel superposed on the lower vessel and having a tube extending into the lower vessel through the opening therein; means interposed between the upper and lower vessels for sealing the opening in the lower vessel when the upper vessel is superposed thereon; means for securing the vessels together so as to maintain said seal and to form a unitary utensil for brewing and pouring of coffee; a pouring spout on the lower vessel; means for closing the spout against the passage of air while the water in the lower vessel is being forced up through said tube and while the brewed coffee is returning to the lower vessel; said sealing means having means depending therefrom and extending down into the lower vessel; and air inlet means carried in suspended relation by the depending means and extending into said spout for allowing the free passage of air into said lower vessel to prevent the formation of a vacuum above the level of the brewed coffee as the same is being poured from the lower vessel through said spout.

7. A coffee maker of the vacuum type comprising a lower vessel and an upper vessel superposed on the lower vessel and having a tube extending into the lower vessel near the bottom thereof, and an opening at the top of said upper vessel; means for securing the vessels together so as to form a unitary utensil for brewing and pouring of the coffee; a filtering device carried by said upper vessel and covering the upper end of said tube to prevent ground coffee from passing down through said tube into the lower vessel; a cover carried in the opening of the top of the upper vessel; resilient detent means for holding the cover in position; and means carried by said cover and engageable with said filtering device for holding said filtering device in a predetermined position on the lower wall of said upper vessel when said cover is positioned in said opening, said means including a guard for preventing the coffee infusion during the brewing operation to splash against the underside of said cover thereby preventing brewed coffee from seeping through the opening at the top of said upper vessel.

8. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; means for sealing the junction of the upper and lower vessels against the atmosphere when the two vessels are secured together; a handle secured to said first-mentioned means; a pouring spout on the lower vessel; means for closing the spout against the passage of air while the water in the lower vessel is being expelled through the said tube and while the brewed coffee is returning to the lower vessel; means on the handle for storing said spout-closing means when removed from the spout; and air inlet means disposed in said lower vessel, extending into said spout, and held in suspended position by said sealing means for supplying air to said lower vessel as the brewed coffee is poured from the same through the spout.

9. A coffee maker of the vacuum type comprising a lower vessel and an upper vessel superposed on the lower vessel and having a tube extending into the lower vessel near the bottom thereof; means for securing the vessels together so as to form a unitary utensil for brewing and pouring of the coffee; means for sealing the lower vessel against ingress of air from said upper vessel when the two vessels are secured together; a pouring spout on the lower vessel; means for closing the spout against the passage of air while the water in the lower vessel is being expelled through the said tube and while the brewed coffee is returning to the lower vessel; means on the utensil for storing said spout-closing means when removed from the spout; an air inlet tube disposed in said spout and extending into said lower vessel for permitting free passage of air into the same after the coffee is brewed and while it is being poured; and hanger means held in position by said sealing means for holding said air inlet tube disposed in said spout and said lower vessel.

10. A coffee maker of the vacuum type comprising a lower vessel, and an upper vessel superposed on the lower vessel having a tube extending into the lower vessel near the bottom thereof; means for securing the vessels together so as to form a unitary utensil for brewing and pouring of coffee; means for sealing the junction of the upper and lower vessels against the atmosphere when the two vessels are secured together; a pouring spout on the lower vessel; means for closing the spout against the passage of air while the water in the lower vessel is being expelled through the said tube and while the brewed coffee is returning to the lower vessel; and air inlet means disposed in said lower vessel extending into said spout and held in suspended position by said sealing means for supplying air to said lower vessel as the brewed coffee is poured from the same through the spout, a normally accessible portion of said utensil being recessed to provide space for storing said spout-closing means when removed from the spout.

11. A coffee maker of the vacuum type comprising a lower vessel, and an upper vessel superposed on the lower vessel having a tube extending into the lower vessel near the bottom thereof; means for securing the vessels together so as to form a unitary utensil for brewing and pouring of coffee; means for sealing the junction of the upper and lower vessels against the atmosphere when the two vessels are secured together; a pouring spout on the lower vessel; removable means for closing the spout against the passage of air while the water in the lower vessel is being expelled through the said tube and while the brewed coffee is returning to the lower vessel, a portion of said utensil being recessed to provide space for storing the spout-closing means during pouring of the brewed coffee through the spout; a spring in said recess; and a cover for the outer opening of said recess, said cover being normally urged into its recess-covering position by said spring and retained in said position by stop means at the mouth of said opening, and said cover being depressed inwardly in said recess against the urge of said spring, upon insertion of the spout-closing means therein.

12. A coffee maker of the vacuum type comprising a lower vessel having an opening at the top thereof and an upper vessel superposed on the lower vessel and having a tube extending into the lower vessel through the opening therein; means interposed between the upper and lower vessels for sealing the opening in the lower vessel when the upper vessel is superposed thereon; means for securing the vessels together so as to maintain said seal and to form a unitary utensil for brewing and pouring of coffee; a pouring spout on the lower vessel; means for closing the spout against the passage of air while the water in the lower vessel is being forced up through said tube and while the brewed coffee is returning to the lower vessel; air-inlet means disposed within the lower vessel for allowing free passage of air into the same to prevent the formation of a vacuum above the level of the brewed coffee as the same is being poured from the lower vessel through said spout; and means depending from the lip of the opening in said lower vessel and held against displacement therefrom by the sealing means when the two vessels are secured together for holding the air-inlet means in proper position within said lower vessel.

13. A coffee maker of the vacuum type comprising a lower vessel having an opening at the top thereof and an upper vessel superposed on the lower vessel and having a tube extending into the lower vessel through the opening therein; means interposed between the upper and lower vessels for sealing the opening in the lower vessel when the upper vessel is superposed thereon; means for securing the vessels together so as to maintain said seal and to form a unitary utensil for brewing and pouring of coffee; a pouring spout on the lower vessel; means for closing the spout against the passage of air while the water in the lower vessel is being forced up through said tube and while the brewed coffee is returning to the lower vessel; an air-inlet tube disposed in said spout and extending into said lower vessel for permitting free passage of air into the same after the coffee is brewed and while it is being poured; and a plurality of hangers each having a hook member disposed over the lip of the opening formed in said lower vessel, said hangers supporting said air-inlet tube within the lower vessel and being held against displacement from the lip of said opening by the sealing means when the two vessels are secured together.

ARTHUR A. JOHNSON.